United States Patent
Berglund et al.

(10) Patent No.: US 7,445,580 B2
(45) Date of Patent: Nov. 4, 2008

(54) METHOD OF REGULATING EGR IN AN INTERNAL COMBUSTION ENGINE AND VEHICLE WITH AN ENGINE WITH ELECTRONIC MEANS FOR APPLYING THE METHOD

(75) Inventors: Sixten Berglund, Torslanda (SE); Anders Eriksson, Göteborg (SE); Marcus Stéen, Angered (SE); Sören Udd, Nödinge (SE)

(73) Assignee: Volvo Lastvagnar AB, Gothenburg (SE)

( * ) Notice: Subject to any disclaimer, the term of this patent is extended or adjusted under 35 U.S.C. 154(b) by 420 days.

(21) Appl. No.: 10/541,318

(22) PCT Filed: Dec. 22, 2003

(86) PCT No.: PCT/SE03/02059

§ 371 (c)(1),
(2), (4) Date: May 10, 2006

(87) PCT Pub. No.: WO2004/058534

PCT Pub. Date: Jul. 15, 2004

(65) Prior Publication Data

US 2006/0247093 A1 Nov. 2, 2006

(30) Foreign Application Priority Data

Dec. 30, 2002 (SE) .................................. 0203893

(51) Int. Cl.
*B60W 10/04* (2006.01)

(52) U.S. Cl. ......................... 477/107; 477/110; 701/104
(58) Field of Classification Search ................... 477/97, 477/107, 110; 701/103, 104, 105, 108
See application file for complete search history.

(56) References Cited

U.S. PATENT DOCUMENTS

| 5,135,443 | A | * | 8/1992 | Paton et al. .................... 475/81 |
| 6,098,005 | A | | 8/2000 | Tsukamoto et al. |
| 7,235,034 | B2 | * | 6/2007 | Berglund et al. ............ 477/107 |
| 2002/0038647 | A1 | | 4/2002 | Tashiro et al. |
| 2006/0041369 | A1 | * | 2/2006 | Berglund et al. ............ 701/100 |
| 2006/0105881 | A1 | * | 5/2006 | Eriksson et al. ............. 477/116 |

FOREIGN PATENT DOCUMENTS

| EP | 1 201 904 | 5/2002 |
| JP | 200-110622 | 4/2000 |

* cited by examiner

*Primary Examiner*—Ha D. Ho
(74) *Attorney, Agent, or Firm*—Young & Thompson

(57) ABSTRACT

Vehicle (A) with an internal combustion engine (1), an automated transmission (2) coupled to the engine, and electronic control elements (3) which control the supply of fuel to the engine combustion chambers and recirculation of exhaust from the engine exhaust side (7) to its intake side (6). The control elements are disposed to compute, while the vehicle is moving, future driving resistance and the time until a future shifting between gears and to control valve elements (9) which regulate exhaust return flow during this time to optimize fuel consumption and emissions, when the gearshifting takes place.

4 Claims, 1 Drawing Sheet

Figure 1:
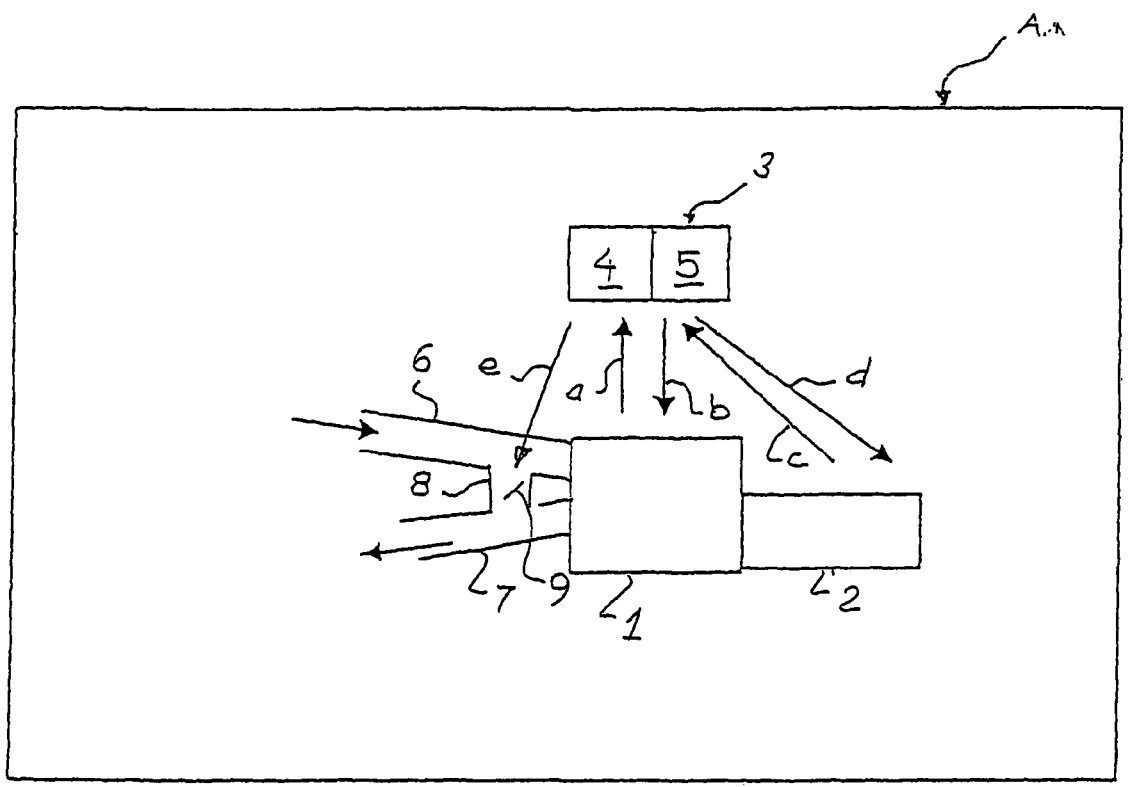

METHOD OF REGULATING EGR IN AN INTERNAL COMBUSTION ENGINE AND VEHICLE WITH AN ENGINE WITH ELECTRONIC MEANS FOR APPLYING THE METHOD

FIELD OF THE INVENTION

The present invention relates to a method of regulating, in an internal combustion engine in a moving vehicle, the recirculation of exhaust from the exhaust side of the engine to the intake side of the engine.

The invention also relates to a vehicle with an internal combustion engine with electronic control means, which control the supply of fuel to the engine combustion chambers and recirculation of exhaust from the engine exhaust side to the engine intake side.

BACKGROUND OF THE INVENTION

During engine operation, it is generally known to continuously control, by means of the engine control unit via regulator valve means in a conduit between the engine exhaust conduit and the engine intake conduit, the amount of recirculated exhaust in relation to the engine operating conditions, so that the best fuel consumption is maintained at the same time as response and low emission requirements are fulfilled. This controlling is, however, momentary and intrareferential, which means that it cannot predict and take into account transients in the engine operating state. Such transients are, for example, shifting in the vehicle gearbox or momentary throttle opening on an uphill incline after driving with torque reduction and engine braking in a downhill incline. When driving with exhaust recirculation, for example, smoke can appear from the engine exhaust pipe in connection with the torque reduction when shifting. Smoke is produced due to the fact that the closing of the recirculation valve initiated by the transient occurs so late that there is a volume of exhaust remaining in the intake manifold, which is drawn into the engine combustion chambers and results in increased particle emissions. This takes the form of smoke.

SUMMARY OF THE INVENTION

The purpose of the present invention is to achieve a method of controlling the exhaust recirculation so that it can also be adapted to future events instead of being limited as today to control which is momentary and intrareferential in the engine.

This is achieved according to the invention by virtue of the fact that the future driving resistance of the vehicle is calculated, that the time until a future transient in the engine operating state is calculated and that the exhaust return flow is regulated during this time to optimize fuel consumption and emissions when the transient takes place.

This method can avoid, for example, the production of smoke when shifting, by closing the recirculation valve ahead of time so that the intake system has time to be emptied of exhaust prior to throttle closing when shifting.

The invention is based on the control means having information on when a future shifting of gears is to take place. This information is based on information on the future changes in vehicle driving resistance. The invention is based on the technology which is described in WO 03/041988. The control unit is in this case disposed to select, with stored parameters and thus knowledge of at least road incline and throttle position (which also can include engine, turbo charger and transmission characteristics), when a future shifting of gears is to take place according to a selected shift strategy. Information on future driving resistance can in this case be obtained with the aid of GPS equipment and electronic maps with stored information on the surrounding topography. Reference is made to the above mentioned patent publication for a more detailed description of the selection of a future gearshift scheme which is optimum with reference to a selected criterion.

A motor vehicle of the type described by way of introduction is characterized according to the invention in that control means are disposed to calculate, while the vehicle is moving, on the basis of at least road incline and throttle position, future driving resistance and the time until a future transient in the engine operating state, and to control the exhaust return flow by regulating valve means during this time to optimize fuel consumption and emissions when the transient takes place.

BRIEF DESCRIPTION OF THE INVENTION

Figure 2:
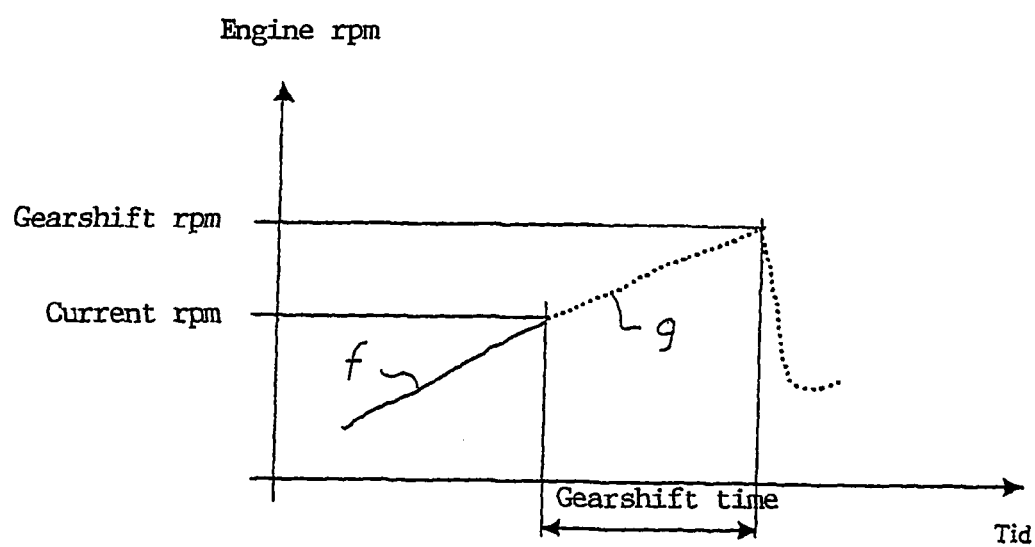

The invention will be described in more detail below with reference to examples shown in the accompanying drawing, where FIG. 1 shows a schematic representation of a drive unit for a vehicle, and FIG. 2 shows a diagram of a simulation of a moving vehicle.

DETAILED DESCRIPTION OF THE INVENTION

The drive unit shown in FIG. 1 in a motor vehicle A comprises an internal combustion engine 1, which is driven by an automated transmission 2. The engine 1 and the transmission 2 are controlled by an electronic control unit 3 comprising an engine control portion 4 and a transmission control portion 5 which communicate with each other. The control can be effected in accordance with the model which is described in the above mentioned WO 03/041988 and which is symbolized by the arrows "a" and "b" for engine control, and "c" and "d" for transmission control.

6 designates an intake conduit to the engine combustion chambers and 7 indicates an exhaust conduit from the engine combustion chambers. The conduits 6 and 7 communicate with each other via conduit 8 through which exhaust in the conduit 7 can be recirculated to the intake conduit 6. In the conduit 8, there is a valve 9 (the EGR valve) by means of which the volume of recirculated exhaust can be controlled continuously between zero (closed valve) and a predetermined maximum value per unit of time. The valve 9 is controlled, as symbolized by the arrow "e" in a known manner by the control unit 3 continuously during the operation of the engine in relation to engine operating conditions, so that the best fuel consumption is always obtained at the same time as the requirements of low particle and $NO_x$ emissions are fulfilled.

The forward motion of the vehicle is recorded in the control unit 3 in the form of increasing engine rpm as a function of time, which is marked in FIG. 2 with a solid curve "f". With information on accelerator pedal position and information from the GPS equipment, for example, with electronic topographical maps, there can be simulated the future driving resistance and the time from a current rpm to an rpm at which the next gearshifting in the transmission is estimated to take place. This is marked with a dotted extension "g" of the curve "f". For a detailed description of how the vehicle driving can be simulated on the basis of a model, reference is made to the above mentioned WO 03/041988.

Within the time period marked in FIG. 2 from the current engine rpm to the rpm for the next gearshift, the control unit 3 regulates the EGR valve 8 towards its closed position, so that the engine intake conduits 6 are emptied of recirculated exhaust volumes when the control unit 3 reduces the engine torque and initiates gearshift. In this manner, an override function is obtained which takes over the momentary intrareferential engine control of the recirculation of exhaust to the intake side of the engine.

Other future transients in the engine operating state than shifting of gears and which can be computed in the above described manner are, for example, torque reduction when the vehicle approaches the crest of a hill, and torque increase after the end of a downhill incline.

The invention claimed is:

1. Method of regulating, in an internal combustion engine (1) in a moving vehicle (A), recirculation of exhaust from the exhaust side (7) of the engine to the intake side (6) of the engine, comprising calculating a future driving resistance of the vehicle (A) calculating a time until a future transient in the engine operating state, and regulating an exhaust return flow during this time to optimize fuel consumption and emissions, when the transient takes place.

2. Method according to claim 1 for regulating return exhaust flow in connection with gearshifting in an automated transmission (2) coupled to the engine (1), wherein the time until a future shifting between gears is calculated, and the exhaust return flow during this time is restricted to optimize fuel consumption and emissions during the shifting between gears.

3. Vehicle with an internal combustion engine (1) with electronic control means (3) for controlling the supply of fuel to the engine combustion chambers and recirculation of exhaust from the exhaust side (7) of the engine to the engine intake side (6), wherein the control means (3) are disposed, while the vehicle is moving, on the basis of input information on at least road incline and throttle position, to calculate future driving resistance and the time until a future transient in the engine operating state, and to control the exhaust return flow by regulating valve means (9) during this time to optimize fuel consumption and emissions when the transient takes place.

4. Vehicle according to claim 3 with an automated transmission (2) coupled to the engine (1), wherein the control means (3) have engine and transmission control functions and are disposed to calculate the time until a future shifting of gears and control the exhaust return flow by regulating the valve means (9) during this time to optmize fuel consumption and emissions during the gearshifting.

\* \* \* \* \*